2,337,927

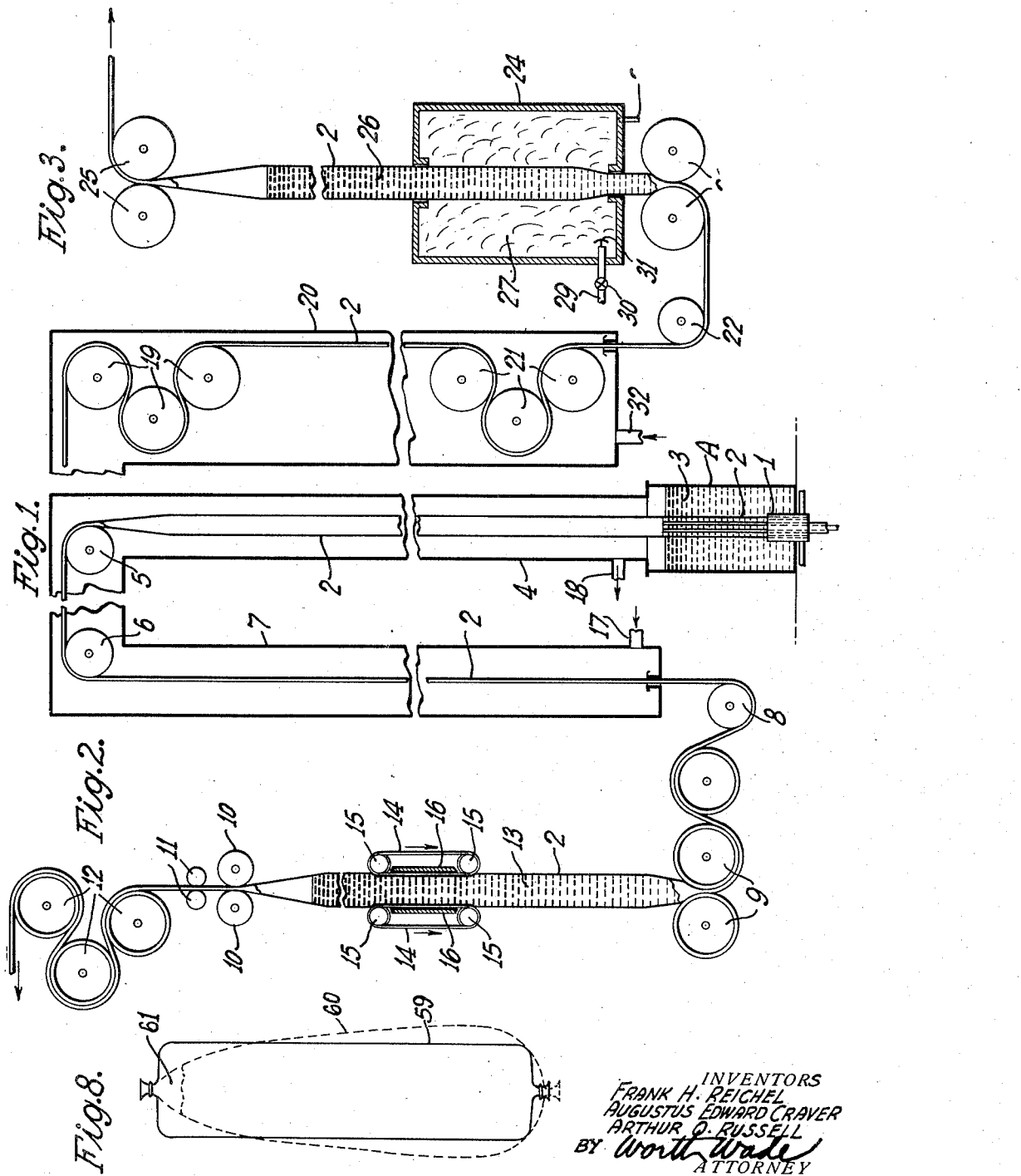
Dec. 28, 1943.  F. H. REICHEL ET AL  2,337,927
APPARATUS FOR MAKING TUBING
Filed Feb. 19, 1938   2 Sheets-Sheet 1
INVENTORS
FRANK H. REICHEL
AUGUSTUS EDWARD CRAVER
ARTHUR O. RUSSELL
BY Worth Wade
ATTORNEY Dec. 28, 1943.  F. H. REICHEL ET AL  2,337,927
APPARATUS FOR MAKING TUBING
Filed Feb. 19, 1938  2 Sheets-Sheet 2
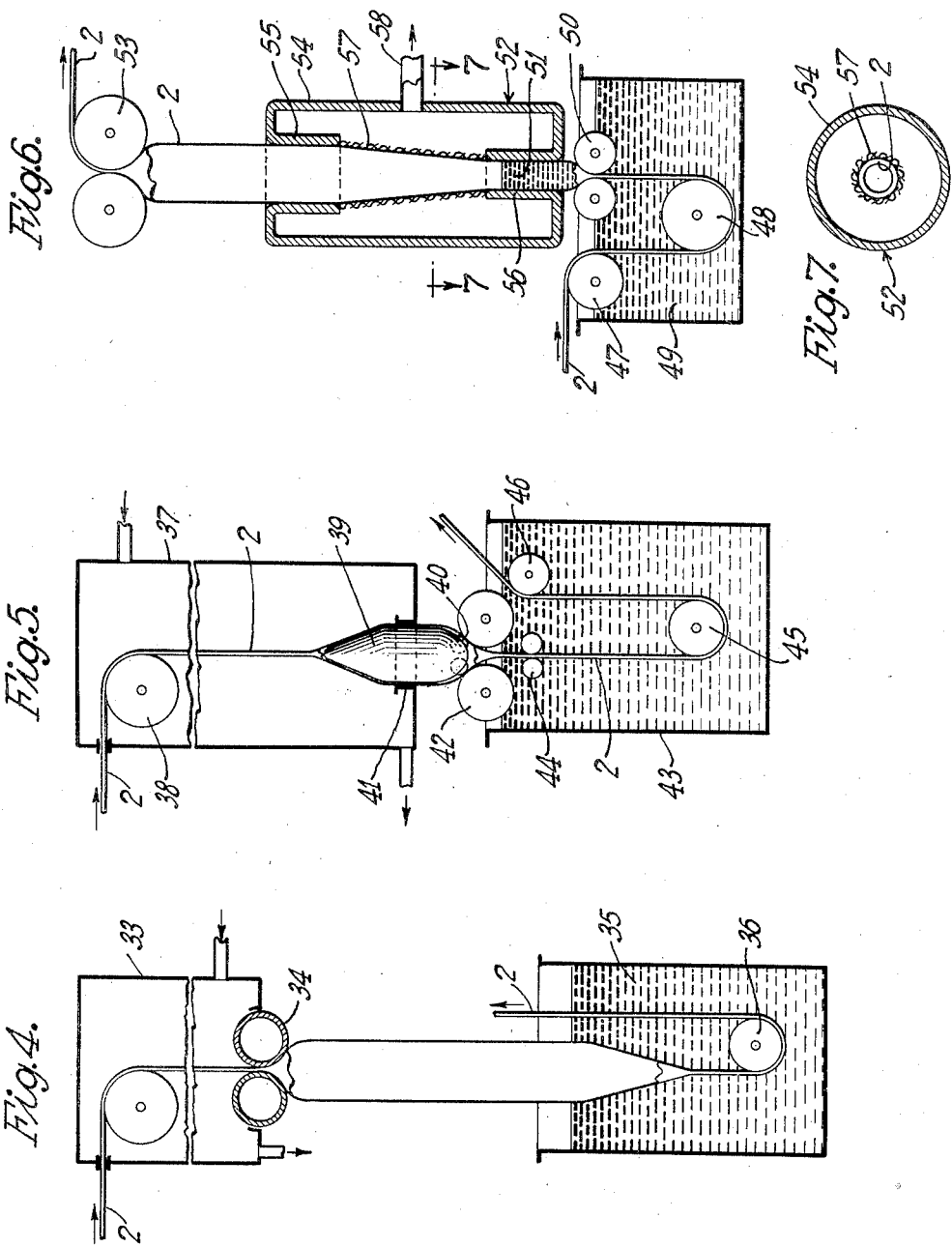
INVENTORS
FRANK H. REICHEL
BY AUGUSTUS EDWARD CRAVER
ARTHUR O. RUSSELL
ATTORNEY Patented Dec. 28, 1943

UNITED STATES PATENT OFFICE 2,337,927

APPARATUS FOR MAKING TUBING

Frank H. Reichel, Augustus Edward Craver, and Arthur O. Russell, Fredericksburg, Va., assignors to Sylvania Industrial Corporation, Fredericksburg, Va., a corporation of Virginia Application February 19, 1938, Serial No. 191,414

5 Claims. (Cl. 18—14)

The invention relates in general to flexible tubing and, in particular, to a process and apparatus for preparing and treating flexible tubing formed of non-fibrous organic plastic materials.

Seamless flexible tubing formed of non-fibrous organic plastic materials such as cellulose esters, cellulose hydrate, synthetitc resins find many applications such as in the packaging of foodstuffs and for encasing candles and other articles. In these arts, high tensile strength and uniformity of size, shape and physical properties are essential. By previous process of manufacture, such tubing has shown more or less non-uniformity of physical properties. In particular, prior tubing has been characterized by a high longitudinal tensile strength, but a low transverse tensile strength. Further, such prior tubing is frequently non-uniform in wall thickness and shows wide variations in stretch and shrinking properties.

Accordingly, the general object of the invention is to provide a flexible tubing of a non-fibrous organic plastic material which is substantially uniform in its physical attributes and properties.

Another object of the invention is to provide a process and apparatus for making from a non-fibrous organic plastic material, a flexible tubing having longitudinal and transverse tensile strength greater than that heretofore obtainable in such tubing.

A specific object of the invention is to provide a process and apparatus for making from a non-fibrous cellulosic material a flexible casing which is substantially non-extensible longitudinally under ordinary packaging operations.

Another specific object of the invention is to provide a process and apparatus for stretching a flexible tubing formed of a non-fibrous organic plastic material whereby the stretching may be carried out continuously in a transverse and/or longitudinal direction.

Other objects of the invention will in part be obvious and will in part appear hereinafter.

According to the invention, the process comprises forming from a non-fibrous organic plastic material a flexible tubing, hardening or coagulating the tubing sufficiently to render it self-sustaining, thereafter continuously stretching the tubing longitudinally and transversely, preferably while the tubing is in the wet gel state, and thereafter fixing the stretched condition of the tubing. It is characteristic of the present invention that the tubing is stretched beyond its normal size and that the stretched condition is rendered permanent.

The invention accordingly comprises the several steps and relation of one or more of such steps with respect to each of the others, and the apparatus possessing the features, elements and the relation of elements which are exemplified in the following detailed disclosure, and the scope of the invention will be indicated in the claims.

The tube-forming solution employed in the process of the invention may comprise any suitable film-forming non-fibrous organic plastic material such as a cellulose derivative, such as cellulose esters, for example, cellulose nitrate, cellulose acetate, cellulose formate, cellulose butyrate, etc.; cellulose ethers whether soluble in water, alkalies or organic solvents such as methyl cellulose, ethyl cellulose, benzyl cellulose, etc.; cellulose ester-ethers and cellulose ether xanthates, cellulose thiourethanes, cellulose xantho-fatty acids and the like; synthetic and natural resins such as urea-formaldehyde resins, glyptal resins, vinyl resins and the like; also rubber, chlorinated rubber, gelatine, casein, etc.

The organic plastic material may be dissolved and/or dispersed in suitable solvents and solvent mixtures therefor which are known to those skilled in the art. The solution or dispersion may be shaped into a tubing in a suitable manner such, for example, as by coating a core or mandrel therewith, or by extruding the dispersion or plastic mass through an annular orifice.

Before the tubing is stretched, it is rendered self-sustaining in a suitable manner having regard for the nature of the material. For example, when the tubing is made of a coagulable film-forming substance such, for example, as a cellulose derivative dissolved in a suitable solvent, the tubing may be subjected to a coagulant of the cellulose derivative whereby the cellulose derivative is coagulated in the form of a self-sustaining tubing. On the other hand, when the tubing is formed of an organic plastic material such, for example, as a resin dissolved in a volatile organic solvent, the solution may be shaped into the form of a tube and the solvent evaporated to such a point that the tubing is self-sustaining. The major portion of the solvents or dispersion medium present in the tubing may be suitably driven off before stretching as by treating the tubing with a flowing current of air which is preferably heated. However, it is preferable to avoid the complete drying out of the tubing before stretching it, because the gel, once dried, does not stretch as readily as when maintained in a wet gel condition up to the time of stretching.

Before being stretched, the self-sustaining tubing is conditioned for stretching by being rendered uniformly plastic and by keeping or placing it in the wet gel state. It has been found advisable not to perform the stretching while the tubing contains a substantial quantity of an active solvent of the tubing material, the chief advantages being that the solvent is seldom removed from the material in a uniform manner, so that the plasticity will vary considerably and that the tubing containing a substantial amount of an active solvent has substantially no "nerve" or toughness and is so soft that it is not capable of being stretched continuously to the amount necessary to attain the objects of the present invention. When stretching transversely is accomplished by means of a column of liquid, the solvent in the tubing tends to be extracted by such liquid, thus rendering the tubing so soft that it finally breaks during stretching.

The surprising discovery was made that these disadvantages may be overcome and the tubing stretched rapidly and continuously by removing the active solvent and replacing it by a swelling agent of the tubing material. The swelling agent is selected with regard to the nature of the tubing material and preferably there is employed a swelling agent which is miscible with the residual solvent of the tubing. When the solvent is miscible with the swelling agent it is readily disseminated uniformly through the walls of the tubing. Thus a tubing swollen with a swelling agent until it is in the gel state is toughened and simultaneously rendered uniformly plastic and capable of stretching uniformly in all directions. For example, with nitrocellulose tubing containing a mixture of alcohol and ether as a solvent, the ether is evaporated or extracted and the tubing treated with a swelling agent comprising 95% aqueous ethyl alcohol in which the residual ether and alcohol is completely miscible.

The tubing is preferably maintained in the wet gel state from the time of formation to the time of stretching. The expression "gel state," as used herein, is intended to cover a tumefied produced containing a swelling agent in excess of the maximum which could be tolerated in the commercially dry product.

Both longitudinal and transverse stretching of the conditioned product is effected continuously, as distinguished from intermittent or discontinuous stretching, by subjecting successive portions of the tubing to tension as hereinafter described, the longitudinal and transverse stretching being effected simultaneously or in sequence. The longitudinal stretching is effected continuously by elongating the tubing by increasing the rate of withdrawal after it has been rendered self-sustaining and conditioned, but before drying and/or converting. The transverse stretching may be carried out by continuously maintaining a pressure differential between the inside and outside of a portion of the tubing while it is travelling continuously through the stretching zone. The pressure differential may be effected by the use of vacuum outside the tubing and/or fluid pressure within the tubing, or by the use of a greater fluid pressure inside, as compared to a fluid pressure outside. Transverse stretching is more uniformly accomplished by exerting a fluid pressure within the tubing, as by the use of air or other gas, but preferably a liquid is employed which is a non-solvent of the tubing material. The tubing may be stretched transversely, also by an internally applied mechanical pressure.

When employing thermoplastic tube-forming material, it has been found that the stretching operations may be facilitated by the application of heat which renders the organic material more plastic. The degree of stretch under a constant force will be dependent upon the plasticity of the tubing which, in turn, is dependent upon its temperature. From this, it may be seen that the degree of stretch may be varied, as desired, merely by controlling the temperature in the region where stretching takes place. The use of heat to render the tubing plastic is particularly beneficial in that it permits the use of a lower pressure differential, the attainment of a more uniform expansion and an expansion to any desired degree. Moreover, during a continuous transverse stretching with an internal liquid, the tubing carries with it a certain amount of liquid from the column, thereby causing a gradual decrease in the expanding force. This decrease in the height of the column may be compensated by a gradual increase of the heat supplied to the zone of expansion and/or by increasing the height of the liquid column as hereinbefore described.

After the tubing has been stretched in accordance with the invention, the stretched structure is fixed by converting the cellulose derivative to cellulose hydrate and/or by drying the tubing, so that the tubing remains in its enlarged and elongated condition. The method of fixing the stretched structure will, of course, vary with the nature of the tube-forming material. Where the tubing is formed of a cellulose derivative, the stretched condition may be fixed by transforming the cellulose derivative to cellulose hydrate, such conversion being accomplished by treating the stretched cellulose derivative with a suitable reagent to deesterify, deetherify, reduce or decompose the cellulose derivative to cellulose hydrate. In the appended claims the expression "converting" is used generically to include all reactions by which a cellulose derivative may be transformed to cellulose hydrate. Another method of fixing the stretched structure is to convert the tubing from the wet gel state to a dry gel state, for example, by evaporation of the residual solvents of the swelling agent, or by passing the stretched tubing through a suitable bath containing a liquid which is not a swelling agent and which will extract the residual solvent, after which the tubing is dried in a known manner. Where heat has been employed to condition and/or as an aid to stretching the tubing, the stretched structure may be fixed by chilling the tubing, for example, by passing it through a bath of cold water or through a stream of cold air or the like. Tubing made of soft thermoplastic resins may have its stretched structure fixed by conversion of the resin into a hard non-fusible form by a high degree of heat, irradiation, etc.

For a fuller understanding of the nature and objects of the invention, reference should be had to the following detailed description taken in connection with the accompanying drawings, in which:

Fig. 1 illustrates diagrammatically and partly in section a tube-extruding unit of one embodiment of the apparatus of the invention;

Figs. 2 to 6 illustrate side elevations of so many embodiments of the stretching unit of the apparatus of the invention;

Fig. 7 is a cross-sectional view of the apparatus of Fig. 6, taken along the line 7—7 thereof; and Fig. 8 is a diagrammatical representation of a sausage casing produced in accordance with the invention.

Referring to the drawings, the extrusion unit A comprises a nozzle 1 disposed in such a manner as to permit a tubing 2 issuing therefrom to pass through a coagulating bath 3 upwardly through the heating chamber 4 and over barrel-shaped drawing roller 5, from which point the tubing may be passed to either of the stretching units shown in Figs. 2 and 3.

Referring to that embodiment of the stretching unit shown in Fig. 2, the tubing 2 is conveyed from roller 5 (in Fig. 1) over roller 6, down through chamber 7 which communicates with chamber 4 of Fig. 1 and around roller 8. A major portion of any organic solvents present in the coagulated tubing may be evaporated therefrom by causing a gas, preferably heated air, to flow through conduit 17 into chambers 7 and 4 in a direction counter-current with respect to the travel of the tubing and withdrawing the solvent laden gas from chamber 4 through conduit 18. Between the heating chamber 7 and the stretching unit, the tubing may be caused to pass through the aforementioned conditioning bath for rendering the plasticity of the tubing uniform.

The tubing 2 passes between cooperating pressure rollers 9 upwardly between barrel-shaped tube-flattening rollers 10, between squeegee rollers 11, and thence around the drawing rollers 12 from which point the tubing may be conveyed to any suitable apparatus wherein washing, fixing the structure, purifying, conditioning and drying operations are carried out.

With the apparatus of Fig. 2, transverse stretching is effected by maintaining a liquid column 13 within the tubing 2 above the rollers 9, the weight of the liquid in the column causing expansion of the tubing to the desired extent. The degree of expansion is governed by the height of the liquid column which may be initially set at the proper height to obtain the desired transverse stretch. The degree and/or rate of expansion may also be controlled during operation of the stretching unit by varying the relative pressures inside and outside the tubing preferably by varying the height of the column. For example, liquid may be added to or taken from the tube by suitable means or the tube be constricted at one or more points to cause the liquid to rise within the tubing. As shown in Fig. 2, the constricting means may comprise two or more travelling belts 14 mounted on rollers 15 and backed by plates 16. The constricting units are mounted so as to permit transverse adjustment relative to one another, thereby affording a means for constricting the tubing and thus varying the height of the liquid column. The plates 16, which may be flat or provided with a curvature coincident with the tubing, are in contact with and support the belts against the tubing. The belts are caused to travel at the same rate as the tubing and are preferably mounted above the point at which transverse expansion of the tubing is substantially complete.

In that embodiment shown in Fig. 2, the longitudinal stretching of the tubing is effected simultaneously with the transverse stretching by causing the rollers 12 to travel at a peripheral speed greater than that of the rollers 9.

Another embodiment of the stretching unit of the invention is shown in Fig. 3 wherein the longitudinal and transverse stretching may be carried out separately instead of simultaneously as hereinbefore described with respect to the apparatus of Fig. 2. Referring to Fig. 3, the coagulated tubing 2 is conveyed from the rollers 5 (Fig. 1) over a series of rollers 19, downwardly through a chamber 20, over another series of rollers, 21. The rollers 21 are caused to travel at a peripheral speed greater than that of rollers 19 for stretching the tubing 2 in a longitudinal direction. The elongated tubing 2 is conveyed from the chamber 20 around the guide roller 22, between cooperating pressure rollers 23 upwardly through a heated chamber 24 and between drawing rollers 25. Transverse stretching of the tubing is effected by maintaining a column of liquid 26 within the tubing 2 between the rollers 23 and 25 in substantially the same manner as effected in the apparatus shown in Fig. 2.

The degree and rate of expansion of thermoplastic tubing may be controlled by subjecting the tubing to a moderate degree of heat just prior to or during the step of stretching the tubing. For example, with the apparatus of Fig. 3, the tubing may be subjected to the action of heated vapor 27 which is injected into the chamber 24 provided with a drain 28 through a conduit 29 having a valve 30 and a deflecting plate 31. The injected vapor 27 preferably comprises steam or a vapor containing moisture or a similar softening agent for the particular tubing.

While the longitudinal stretching in the embodiment shown in Fig. 3 has been described as taking place independently of the transverse stretching, stretching in both directions may be effected simultaneously by causing the drawing rollers 25 to rotate at a speed greater than that of rollers 23.

A portion of the volatile solvents present in the tubing may be driven off from the coagulated tubing 2 by injecting the heated gas into chamber 20 through conduit 32, the gas being caused to pass upwardly through chamber 20 and downwardly through chamber 4 (Fig. 1), the mixture being withdrawn through conduit 18 and the solvent recovered therefrom in any suitable manner. The heated gas, preferably air, may be conditioned as by adding moisture or a suitable swelling agent thereto before being introduced into chamber 20 so as to aid in maintaining the tubing in a gel state.

In Fig. 4, there is illustrated an embodiment of the stretching unit of the invention in which transverse stretching is effected by a pressure differential between an enclosed volume of gas and the external atmosphere. The tubing 2 is preferably passed first through a chamber 33 wherein it is subjected to heat and/or solvent vapor to render the tubing material more plastic. The treated tubing passes between rubber covered squeeze rollers 34 and downwardly into a bath 35 of cold liquid, under a roller 36 and out of the bath. The air trapped between the squeeze rollers 34 and the liquid bath 35 causes the tubing to expand, and the expanded structure is fixed when it is chilled in the cold liquid.

In Fig. 5 there is shown another embodiment of the stretching unit in which transverse stretching is effected by continuously passing the tubing 2 through a conditioning chamber 37 and pulling the tubing downwardly from a roller 38 over an enclosed mandrel 39. The mandrel is preferably made of a heavy material such as metal, tapered at its upper end and provided on its lower end with a pair of freely rotatable rollers 40. The mandrel is prevented from sidewise displacement by means of the collar 41 which is positioned at the bottom of the conditioning chamber. The mandrel rests upon the tubing as it passes between the spaced rollers 42 which support the mandrel. The stretched structure of the tubing is set when the tubing passes into a bath 43 of liquid of suitable composition to further coagulate and/or to chill the tubing. The internal surface of the tubing is preferably maintained wet with a suitable lubricant which is trapped above the squeeze rollers 44, the lubricant facilitating slippage over the mandrel 39. The tubing passes under the roller 45 and out of the bath over roller 46. The mandrel 39 is positioned with respect to the chamber 37 so that the tubing has attained its maximum diameter before it passes from the conditioning chamber.

In the apparatus of Figs. 6 and 7, the transverse stretching is accomplished by means of a pressure differential created by means of an internal gas pressure and an externally created vacuum. In this apparatus, the tubing 2 passes first over rollers 47 and 48 through a liquid bath 49 which tumefies the tubing and upwardly between squeeze rollers 50, above which the tubing is extended to its normal diameter by a weighted body in the form of a short column 51 of a heavy liquid such as mercury. The tubing passes upwardly through the vacuum chamber 52 and between squeeze rollers 53 which serve to enclose a volume of gas within the tubing. The vacuum chamber comprises a rigid heavy walled cylinder 54, the ends of which are pierced by short cylinders 55 and 56. The enclosed ends of the cylinders 55 and 56 are joined by a seamless foraminous tubing such, for example, as a porous tubular fabric 57, as shown, or a porous unglazed earthen tube. A vacuum is created between the porous tubular fabric 57 and the outer cylinder 54 by suitable vacuum pump (not shown) connected to the line 58. As the tubing passes through the chamber 52, the wet tubing walls are pressed tightly against the fabric 57, thus effecting a continuous transverse stretching of the tubing.

When tubing is stretched transversely by any of the means shown in Figs. 4, 5 and 6, the tubing may be stretched longitudinally either simultaneously or separately by any suitable means such, for example, as the means shown in Figs. 2 and 3.

The tubing may be purified and finished in any desired manner, for example, by subjecting it to suitable baths for washing, bleaching, dyeing, plasticizing, preserving, etc., and the purified and treated tubing may then be dried in any suitable manner. A suitable drier for accomplishing the drying of the tubing is that shown in U. S. Patent No. 2,070,252.

The process of forming and stretching the casing is carried out continuously, thereby greatly increasing the rate of production as compared to that of discontinuous processes. The longitudinal stretching of the tubing greatly increases the tensile strength and obviously increases the linear production of the product. The transverse stretching of the tubing, according to the invention, results in thinner walls, improved transparency and an increased transverse tensile strength. Moreover, there is produced by transverse stretching, a larger casing at a cost which is a little more than that required to produce a casing of smaller diameter. As a result of the correlation of the process of forming and stretching, as herein described, there is produced a product having a higher tensile strength both longitudinally and transversely and a greater bursting resistance when stuffed with sausage, and which is substantially non-stretching after stuffing and during the curing and storing of the sausage.

There is shown in Fig. 8 an outline of a casing produced by the present process, the line 59 representing the wall of the present casing. When the casing is stuffed under normal stuffing pressures with sausage meat, there is formed a product having square shoulders, as illustrated by the line 59 and this product is capable of being suspended by one end during smoking and curing without any substantial alteration of its shape. In contrast thereto, a sausage stuffed in a casing of the prior art, under the same conditions will produce a product which, when suspended during smoking and curing, tends to elongate. This elongation produces a sausage having an enlarged lower end and a tapering upper end. The outline of such stuffed casing is represented in Fig. 8 by the broken line 60. As a result of the elongation of the casing, under the weight of the meat, an air pocket 61 is formed at the top of the prior art casing.

While the present process has particular reference to the production of tubing adapted for use as sausage casing, it is to be understood that the tubing produced may be employed for other purposes such, for example, as packaging materials for various types of foodstuffs, such as meat products, ice cream, food pastes, also greases and industrial pastes, tooth paste, etc.; as casings for candles, bottles and other objects. When slit into short sections, the tubing is adapted for use as a bottle closure band.

Since certain changes in carrying out the above process, and certain modifications in the article which embody the invention may be made without departing from its scope, it is intended that all matter contained in the above description or shown in the accompanying drawings shall be interpreted as illustrative and not in a limiting sense.

We claim:

1. In an apparatus for producing tubing, the combination of, an annular extrusion nozzle, means for supplying a coagulable film-forming substance dispersed in a solvent to said nozzle, means for maintaining a liquid coagulant about the orifice of said nozzle, means disposed above said coagulant for directing a gas against the extruded and coagulated tubing to extract residual solvent therefrom, means for thereafter applying internal pressure to said tubing to stretch said completely coagulated tubing transversely, and means for continuously passing the extruded tubing successively through the coagulant, the solvent extraction means, and the stretching means.

2. In an apparatus for stretching plastic tubing, the combination of, spaced pairs of pressure rollers, means for passing tubing between said rollers, a column of fluid disposed interiorly of the tubing between said rollers to stretch said tubing transversely, means for simultaneously stretching the tubing longitudinally and a heating jacket surrounding a portion of said tubing for softening the tubing to facilitate stretching.

3. In an apparatus for stretching plastic tubing, the combination of, a conditioning chamber, a vessel containing liquid disposed under said chamber, means for passing a tubing through said conditioning chamber and downwardly into and upwardly out of the liquid contained in said vessel, and means or stretching said tubing between said conditioning chamber and said liquid.

4. An apparatus for stretching plastic tubing comprising spaced pairs of pressure rollers between which the tubing passes, a weighted body disposed within said tubing between said pairs of pressure rollers to distend a portion of the tubing and means for creating a pressure differential between the inside and outside of another portion of the tubing between said pairs of pressure rollers.

5. In an apparatus for producing plastic tubing, the combination of, means for continuously forming the tubing from a plastic material, means for stretching successive portions of the tubing longitudinally, means for stretching the tubing transversely, and means for heating the tubing while it is undergoing transverse stretching.

FRANK H. REICHEL.
AUGUSTUS EDWARD CRAVER.
ARTHUR O. RUSSELL.

CERTIFICATE OF CORRECTION.

Patent No. 2,337,927. December 28, 1943.

FRANK H. REICHEL, ET AL.

It is hereby certified that error appears in the printed specification of the above numbered patent requiring correction as follows: Page 1, first column, line 7, for "synthetitic" read --synthetic--; page 2, first column, line 46, for "produced" read --product--; page 5, first column, line 4, claim 3, for "means or" read --means for--; and that the said Letters Patent should be read with this correction therein that the same may conform to the record of the case in the Patent Office.

Signed and sealed this 4th day of April, A. D. 1944.

Leslie Frazer

(Seal)                                Acting Commissioner of Patents.